United States Patent [19]

Imada

[11] Patent Number: 5,744,809
[45] Date of Patent: Apr. 28, 1998

[54] CHROMATICITY TESTING DEVICE OF CRT PHOSPHOR SCREEN

[75] Inventor: Kouji Imada, Shiga, Japan

[73] Assignee: NEC Corporation, Tokyo, Japan

[21] Appl. No.: 761,834

[22] Filed: Dec. 9, 1996

[30] Foreign Application Priority Data

Dec. 8, 1995 [JP] Japan .................. 7-320402

[51] Int. Cl.$^6$ .................. G01J 3/46
[52] U.S. Cl. .................. 250/461.1; 250/360.1
[58] Field of Search .................. 250/358.1, 359.1, 250/360.1, 458.1, 459.1, 461.1

[56] References Cited

U.S. PATENT DOCUMENTS

| 4,584,481 | 4/1986 | Matey | 250/459.1 |
| 5,640,019 | 6/1997 | Ehemann, Jr. et al. | 250/461.1 |

FOREIGN PATENT DOCUMENTS 62-238427  10/1987  Japan .

Primary Examiner—Edward J. Glick
Attorney, Agent, or Firm—Sughrue, Mion, Zinn, Macpeak & Seas, PLLC

[57] ABSTRACT

A chromaticity testing device of a CRT phosphor screen is provided, which enables the on-line automatic testing. A supporting member is provided for supporting a face panel of a color CRT having a phosphor screen therein. A light source emits UV light toward the phosphor screen placed on the member. A movable sensor unit senses visible light emitted from a position of the phosphor screen due to the illuminated UV light and outputs chromaticity signals for the red, green and blue components of the visible light thus sensed. A judgment section receives the chromaticity signals outputted from the sensor unit to determine the chromaticity values corresponding to the chromaticity signals thus received, and compares the chromaticity values thus determined with corresponding preset values to thereby judge whether the chromaticity values are acceptable or not. A control section controls the sensor unit and the judgment section. The sensor unit is located to be contacted with the surface of the face panel on sensing to avoid the effect of external light under the control of the control section.

5 Claims, 3 Drawing Sheets

CHROMATICITY TESTING DEVICE OF CRT PHOSPHOR SCREEN

BACKGROUND OF THE INVENTION

1. Field of the Invention

The present invention relates to a testing device of a color Cathode-Ray Tube (CRT) and more particularly, to a chromaticity testing device of a phosphor screen of a color CRT, which makes it possible to automatically measure the chromaticity of the screen.

2. Description of the Prior Art

In recent years, color CRTs capable of high performance, multifunction, and high definition display have been mainly used with computers according to the tendency that communications, image processing, and other technologies have been popularized.

Conventionally, the quality of the phosphor screen of the color CRT (such as the color uniformity and brightness uniformity) has been tested, for example, by a visual sensory test. However, this test is unreliable. Then, a conventional chromaticity testing device as shown in FIG. 1 has been used, which was disclosed in the Japanese Non-Examined Patent Publication No. 62-238427 published in October 1987.

The conventional testing device 121 shown in FIG. 1 includes a panel stage 124 on which a face panel 102 of a color CRT having a phosphor screen 103 is placed as a testing specimen 101. The stage 124 is supported by movable tables 149 and 150. The lower table 150 is placed on a base 122 and is able to be moved along an X direction in a horizontal plane. The upper table 149 is placed on the lower table 150 and is able to be moved along a Y direction in a horizontal plane. The X and Y directions are perpendicular to each other.

The device 121 further includes an ultraviolet (UV) light source unit 125 for emitting a beam 126 of UV light, and a sensor unit 128 for receiving and sensing the beam 126 transmitted through the phosphor screen 103 placed on the panel stage 124. The UV light source unit 125 is provided inside the base 122. The sensor unit 128 is located over the panel stage 124. The unit 128 receives and senses the beam 126 transmitted through the phosphor screen 103 placed on the panel stage 124.

The UV light source unit 125 has an air-cooled mercury lamp 130 placed in a lamp house 129, optical lenses 131, optical filters 132 for removing visible components of the UV light beam 126, an optical beam splitter 133, and an UV light sensor 134.

The mercury lamp 130 generates and emits the beam 126 of UV light along the horizontal direction. The lenses 131 are horizontally arranged along the optical path of the beam 126 to thereby transmit the beam 126 to the testing specimen 101 and the sensor unit 128. The shape of the beam 126 is changed to have a group of parallel rays with a diameter of 50 mm by the lenses 131. The filters 132 serve to remove the visible component of the beam 126, thereby leaving the UV component only in the beam 126.

The beam splitter 133 splits the received beam 126 so that approximately 90% of the beam 126 is reflected by the splitter 133 along the vertical direction, and the remaining approximately 10% of the beam 126 is horizontally transmitted through the splitter 133 to the sensor 134. The sensor 134 detects the intensity of the received beam 126 containing the UV component only, and sends an electric signal corresponding to the intensity value thus obtained to a power supply (not shown) for the lamp 120. Thus, the amount of the UV light beam 126 emitted from the lamp 130 is kept constant.

To keep the optical path length between the UV light source unit 125 and the face panel 102 placed on the stage 124 at a preset value even if the sort (or, tube type) of the panel 102 and/or the measuring locations of the panel 102 are/is changed, the unit 125 is designed to be movable in the vertical direction (i.e., the Z direction) perpendicular to the X and Y directions.

In the sensor unit 128, an aperture stop 136 fixed at the lower end of the unit 128 has an aperture 135 with a diameter of 10 to 20 mm. A UV light sensor subunit 139 includes an UV light dichroic mirror 137, and a UV light detector 138. A blue sensor subunit 143 includes a UV component removing filter 140, a blue dichroic mirror 141, and a blue light detector 142. A red sensor subunit 146 includes a red dichroic mirror 144, and a red light detector 145. A green sensor subunit 148 has a green light detector 147.

The aperture stop 136, the UV light sensor subunit 139, the UV component removing filter 140, the blue sensor subunit 143, the red sensor subunit 146, and the green sensor subunit 148 are serially arranged in this order in the optical path of the beam 126 passed through the phosphor screen 103 of the panel 102. The relative positions of the detectors 138, 142, and 145 to the corresponding dichroic mirrors 137, 141, and 144 are established so that the optical path lengths from the stop 136 to the respective detectors 138, 142, 145, and 147 are all identical.

The UV light beam 126 limited by the aperture stop 136 first enters the UV light dichroic mirror 137 provided in the UV light sensor subunit 139. The dichroic mirror 137 selectively reflects the UV component only, and the reflected UV component then enters the UV detector 138. An electric brightness signal outputted from the detector 138 allows a pinhole or pinholes in the phosphor screen 103 to be detected.

Next, the UV component of the beam 126, which has been passed through the UV light dichroic mirror 137, is almost completely removed by the filter 140, thereby generating a beam of visible light. The visible light beam enters the blue dichroic mirror 141. The mirror 141 selectively reflects the blue component of the beam, and the reflected blue component enters the detector 142. The visible light beam passed through the blue dichroic mirror 141 then enters the red dichroic mirror 144. The mirror 144 selectively reflects the red component of the beam, and the reflected red component enters the detector 145. The beam passed through the red dichroic mirror 144, which contains the green component only, enters the green detector 147.

The detectors 142, 145, and 147 outputs electric brightness signals of the blue, red, and green colors, respectively to a controller (not shown). From the three brightness signals, the values of the chromaticity and the relative brightness for the blue, red, and green colors are able to be calculated by the controller.

By moving the tables 149 and 150 in the X and Y directions, the panel stage 124 loaded with the panel 102 to be tested is able to be moved in the horizontal plane. Thus, any portion or location of the phosphor screen 103 of the panel 102 can be tested.

The conventional testing device as shown in FIG. 1 eliminates the visual sensory test, allowing the quantitative and objective test to be conducted. However, it presents the following problems.

A spectroscopic means is used for chromaticity testing and therefore, the expensive mercury lamp 130 is required for use as the UV light source. Also, because the sensor unit 128 is not contacted with the panel 102, external light must be shut off during the test. This means that a dark room is essentially required, which will raise the testing cost.

Thus, it is very difficult for the conventional testing device 121 to perform the on-line testing due to the cost. This means that off-line, sampling testing is needed for this purpose.

SUMMARY OF THE INVENTION

Accordingly, an object of the present invention is to provide a chromaticity testing device of a phosphor screen of a color CRT that allows on-line automatic testing at a low cost.

Another object of the present invention is to provide a chromaticity testing device of a phosphor screen of a color CRT that is able to eliminate the need for an expensive light source such as a mercury lamp.

Still another object of the present invention is to provide a chromaticity testing device of a phosphor screen of a color CRT that is able to improve the quality of a phosphor screen.

A chromaticity testing device of a phosphor screen of a color CRT according to the present invention includes a supporting member for supporting a face panel of a color CRT having a phosphor screen therein, a UV light source for emitting UV light toward the phosphor screen placed on the member, and a movable sensor unit for sensing visible light emitted from a position of the phosphor screen due to the illuminated UV light and outputting chromaticity signals for the red, green and blue components of the visible light thus sensed.

The device further includes a judgment section, and a control section.

The judgment section receives the chromaticity signals outputted from the sensor unit to determine the chromaticity values corresponding to the chromaticity signals thus received. The judgment section then compares the chromaticity values thus determined with corresponding preset values to thereby judge whether the chromaticity values are acceptable or not.

The control section controls the sensor unit and the judgment section.

The sensor unit is located to be contacted with the surface of the face panel on sensing to avoid the effect of external light under the control of the control section.

With the chromaticity testing device according to the present invention, the movable sensor unit is located to be contacted with the surface of the face panel on sensing to avoid the effect of external light, and it senses visible light emitted from a position of the phosphor screen due to the illuminated UV light and outputting chromaticity signals for the red, green and blue components of the visible light thus sensed.

Therefore, it is sufficient that the UV light source emits UV light toward the phosphor screen placed on the supporting member. This means that no expensive light source such as a mercury lamp is needed. Also, since the sensor unit is not subjected to the effect of external light, no dark room is required.

As a result, on-line automatic testing can be realized at a low cost.

Further, if the chromaticity signals outputted from the sensor unit are monitored, the tendency at which the chromaticity values are varied can easily be determined. Therefore, by feeding back the tendency thus determined to a prior fabrication step of the CRT, the quality of the phosphor screen can be improved.

In a preferred embodiment of the present invention, a data processing section is further provided. This data processing section accumulates the chromaticity values outputted from the judgment section and statistically processing the accumulated chromaticity values at the different positions of the phosphor screen, thereby determining the deviation tendency of the chromaticity values from the preset values in the entire phosphor screen.

In another preferred embodiment of the present invention, he movable sensor unit is moved on sensing and senses the visible light emitted from different positions of the phosphor screen due to the illuminated UV light.

In still another preferred embodiment of the present invention, a conveyor for conveying the supporting member is additionally provided.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
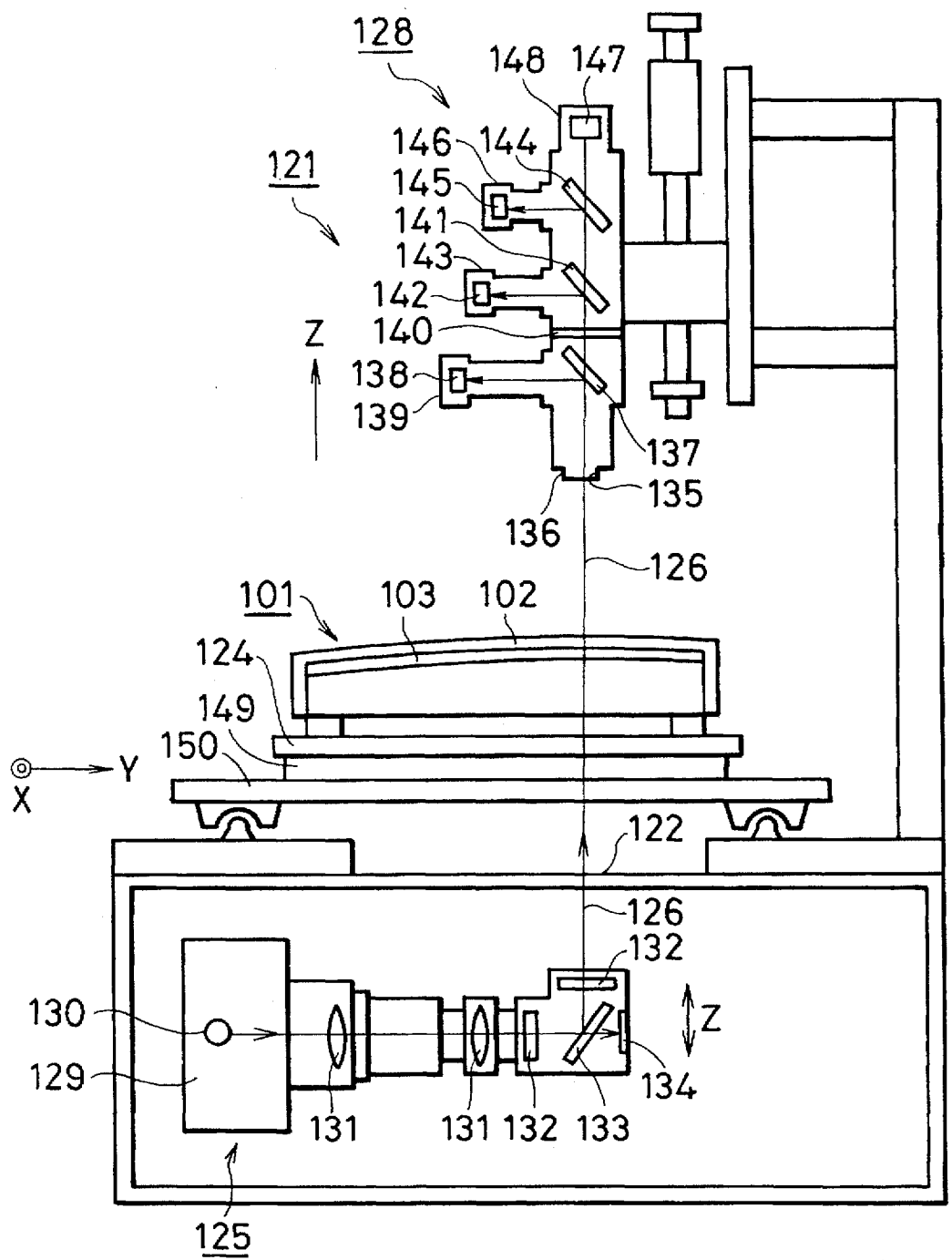
FIG. 1 is a schematic cross-sectional view of a conventional chromaticity testing device of a phosphor screen of a color CRT.

A preferred embodiment of the present invention will be described in detail below while referring to the drawings attached.

Figure 2:
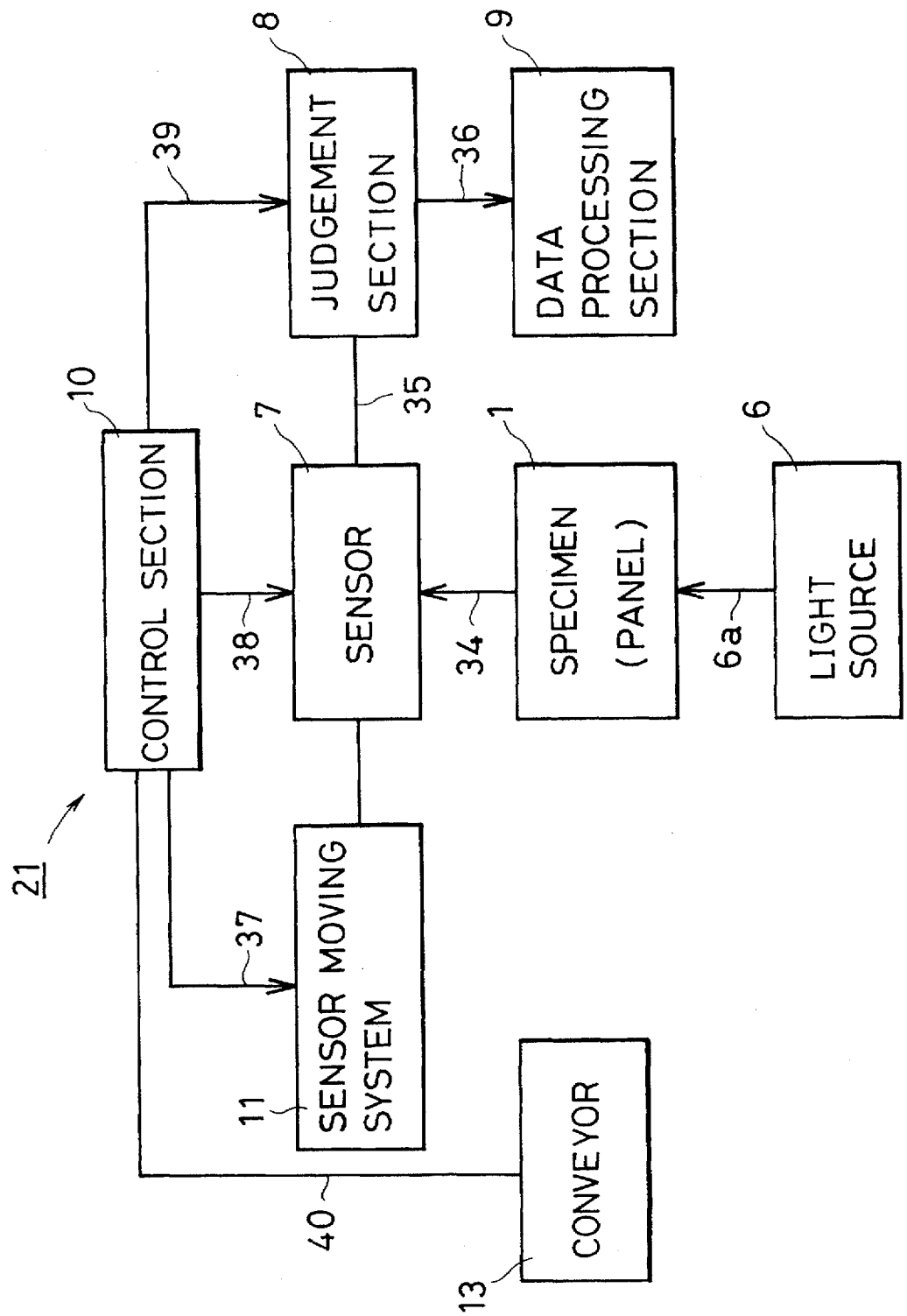
FIG. 2 is a block diagram showing a chromaticity testing device of a phosphor screen of a color CRT according to an embodiment of the present invention.
Figure 3:
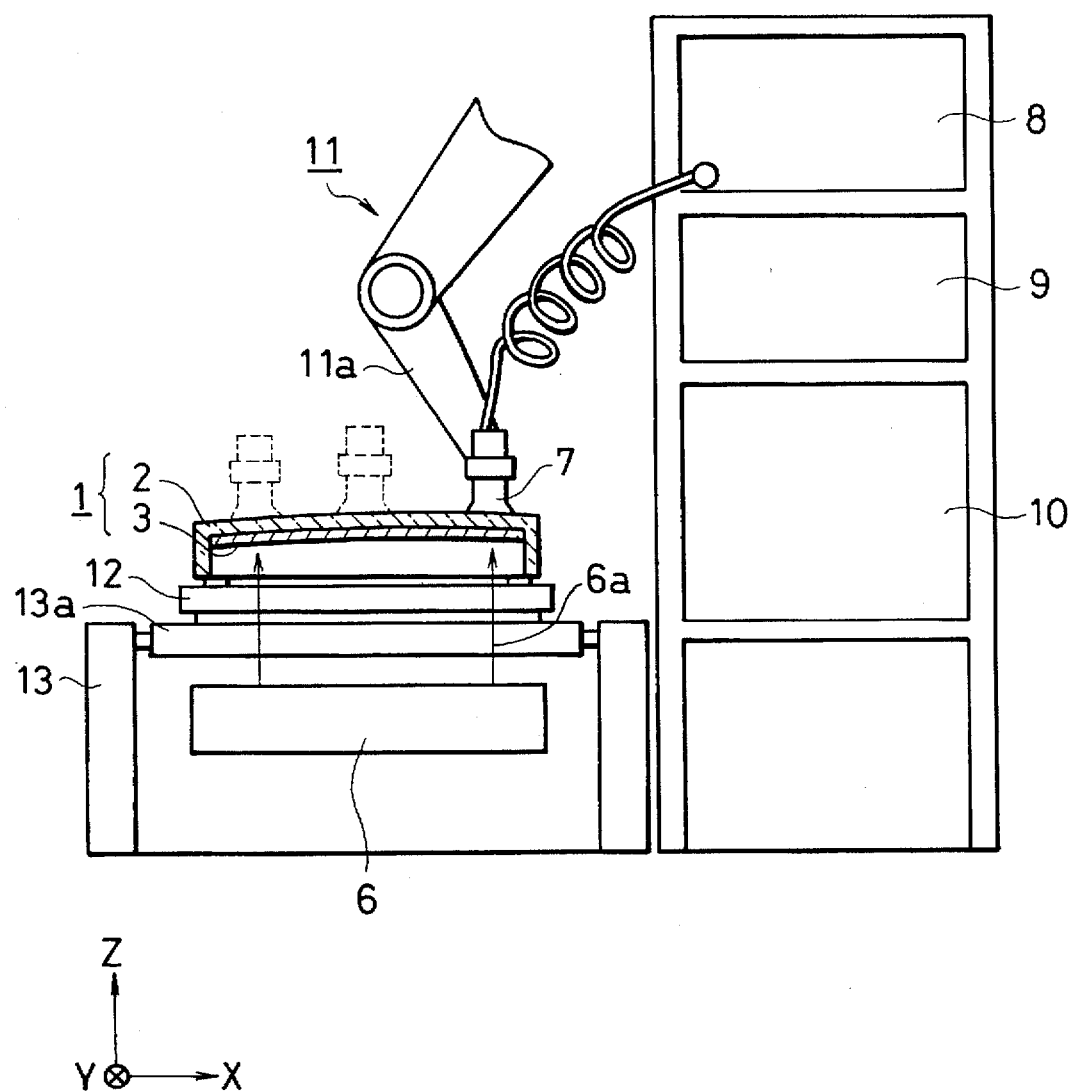
FIG. 3 is a schematic cross-sectional view showing the configuration of the chromaticity testing device according to the embodiment of FIG. 2.

As shown in FIGS. 2 and 3, a chromaticity testing device 21 of a phosphor screen of a color CRT according to an embodiment of the present invention has a light source 6, an optical sensor unit 7, a judgment section 8, a data processing section 9, a control section 10, a sensor moving system 11, a panel stage 12, and a conveyor 13.

The light source 6 is fixed under conveying belts 13a of the conveyor 13 and is exposed from a space between the belts 13a. Here, the light source 6 is made of a linear UV lamp such as a so-called "black light", which emits a strip-shaped beam 6a of UV light. Specifically, the light source 6 horizontally extends along the width direction of the belts 13a.

On the belts 13a of the conveyor 13, a plurality of panel stages 12 are loaded. A plurality of testing specimens 1, i.e., face panels 2 of a color CRT, are placed on the stages 12, respectively. These specimens 1 are transferred in one by one sequentially by the conveyor 13.

Each of the face panels 2 has a phosphor screen 3 formed on its inside face. The screen 3 includes three kinds of phosphors, each of which emits red (R), green (G), and blue (B) light, arranged in the form of stripes or a matrix.

The sensor 7 detects the light intensity of the red, green, and blue components of the incident visible light 34 emitted from the phosphor screen 3, and outputs chromaticity signals 35 corresponding to the light intensity of the individual colors to the judgment section 8.

To make it possible to sense the light intensity at different positions of the screen 3, the sensor moving system has an arm 11a that holds the sensor 7 and moves it to a desired position of the specimen 1.

To avoid the effect of external light, the end of the sensor 7 is contacted with the surface of the face panel 2 on sensing, as shown in FIG. 3. Thus, the sensor 7 is able to receive only the visible light emitted from the screen 3.

The judgment section 8 is equipped with the capability of receiving the chromaticity signals outputted from the sensor 7, calculating the chromaticity values as chromaticity coordinate values, and comparing the calculated chromaticity coordinate values with the preset tolerable range of chromaticity coordinate values for making judgment.

In addition, the section 8 has the capability of outputting the calculated chromaticity coordinate values to the data processing section 9 as the chromaticity data 36.

The data processing section 9 is made of a processor that accumulates the chromaticity data 36 outputted from the judgment section 8 for statistical processing. When required, the statistically processed data is outputted.

The sensor moving system 11 is equipped with an arm 11a. The arm lie holds the sensor 7 and move it in the X, Y, and t directions. The sensor 7 is contacted with the surface of the face panel 2 at desired positions on sensing.

The control section 10 controls the sensor moving system 11, the sensor unit 7, and the judgment section by control signals 37, 38, and 39, respectively.

Next, the operation of the chromaticity testing device 21 according to the embodiment will be described below.

First, the arm 11a holds the sensor 7 in the predetermined ready position not to be contacted with any testing specimen 1 When the specimens 1 are transferred by the conveyor 13, and a first one of the specimens 1 is brought to a predetermined testing position which is just above the light source 6.

The control section 10 receives a signal 40 from the conveyor 13, thereby detecting that the conveyor 13 is in the testing position. The control section 10 sends the control signal 37 to the sensor moving system 11. The system 11 operates the arm 11a on the basis of the control signal 37 to move the sensor 7 to the first test position on the face panel 2 as the specimen 1. The sensor 7 is brought into contact with the surface of the face panel 2 in the first test position and fixed.

The phosphor screen 3 of the specimen 1 is subjected to the UV light 6a emitted from the light source 6, thereby emitting the visible light 34. The visible light 34 pass through the face panel 2 to enter the sensor 7.

On the basis of the control signal 38 from the control section 10, the sensor 7 detects the light intensity of the G, and B components of the visible light 34, and then outputs the chromaticity signals 35 corresponding to the detected intensity to the judgment section 8.

On the basis of the control signal 39 from the control 10, the judgment section 8 calculates the chromaticity values for the visible light 34 as chromaticity coordinate values from the chromaticity signals 35 thus inputted.

The judgment section 8 identifies whether the chromaticity coordinate values are in the specified tolerable range of chromaticity coordinate values or not, making judgment of whether they are acceptable or not. At the same time, the judgment section 8 outputs the chromaticity coordinate values the data processing section 9 as chromaticity data Thereafter, the sensor moving system 11 receives the control signal 37 outputted from the control section 10, and moves the sensor 7 and second test position of the specimen 1. The test by the sensor 7 and the judgment section 8 is then conducted again.

For all the predetermined test positions of the specimen 1 (for example, nine positions on the face panel 2), moving of the sensor 7 and the testing operation are repeated. At the completion of testing for all the test positions, the sensor moving system 11 moves the sensor 7 to the original ready position on the basis of the control signal 37 from the control section 10.

Through the above sequence of operations, testing of the first specimen 1 is completed. This sequence of operations is repeated to provide continuous and automatic testing of the plurality of specimens 1. In other words, on-line automatic testing can be conducted.

On the other hand, the data processing section 9 accumulates and collects the sequentially delivered chromaticity data 36 for statistical processing. The result of this processing is fed back to the manufacturing process as quality control data. When a fault is detected, an appropriate measure is immediately taken to avoid such the fault. Such a quick and appropriate feedback improves the quality of the phosphor screen 3.

With the chromaticity testing device 21 according to the is present invention, the movable sensor unit 7 is located to be contacted with the surface of the face panel 2 on sensing to avoid the effect of external light, and it senses visible light 34 emitted from the respective positions of the phosphor screen 3 due to the illuminated UV light 6a, and outputs the chromaticity signals 35 for the red, green and blue components of the visible light 34 thus sensed.

Therefore, it is sufficient that the UV light source 6 emits UV light 6a toward the phosphor screen 3 placed on the panel stage 12. This means that no expensive light source such as a mercury lamp is needed. Also, since the sensor unit 7 is not subjected to the effect of external light, no darkroom is required. As a result, on-line automatic testing can be realized at a low cost.

Further, if the chromaticity signals 35 outputted from the sensor unit 7 are monitored, the tendency at which the chromaticity values are varied can easily be determined. Therefore, by feeding back the tendency thus determined to a prior fabrication step of the CRT, the quality of the phosphor screen 3 can be improved.

In the above embodiment, the sensor 7 is moved to be located at different positions. However, a set of the sensors 7 maybe used at a time to enable the sensing behavior for different positions.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A chromaticity testing device of a phosphor screen of a color CRT, said device comprising:

a supporting member for supporting a face panel of a color CRT having a phosphor screen therein;

a UV light source for emitting UV light toward said phosphor screen placed on said member;

a movable sensor unit for sensing visible light emitted from a position on said phosphor screen due to illumination by said UV light and outputting chromaticity signals for the red, green and blue components of said emitted visible light;

a judgment section for receiving said chromaticity signals output from said sensor unit to determine chromaticity values corresponding to said chromaticity signals, and for comparing said chromaticity values with corresponding preset values to thereby judge whether said chromaticity values are acceptable or not; and a control section for controlling said sensor unit and said judgment section;

wherein said sensor unit is located to be contacted with the surface of said face panel on sensing to avoid the effect of external light under the control of said control section.

2. A device as claimed in the claim 1, wherein said light source unit is a UV light lamp.

3. A device as claimed in the claim 1, further comprising a data processing section for accumulating said chromaticity values output from said judgement section for different positions on said phosphor screen and statistically processing said accumulated chromaticity values for different positions on said phosphor screen, thereby determining a deviation tendency of said chromaticity values from the preset values for said different positions on said phosphor screen.

4. A device as claimed in the claim 1, wherein said movable sensor unit is moved on sensing and senses the visible light emitted from different positions of said phosphor screen due to illumination by UV light.

5. A device as claimed in the claim 1, further comprising a conveyor for conveying said supporting member;

and wherein said sensor repeated its sensing behavior for a plurality of face panels successively conveyed by the conveyor.

* * * * *

UNITED STATES PATENT AND TRADEMARK OFFICE
CERTIFICATE OF CORRECTION

PATENT NO.    : 5,744,809
DATED         : April 28, 1998
INVENTOR(S)   : Kouji IMADA It is certified that error(s) appears in the above-identified patent and that said Letters Patent is hereby corrected as shown below:

Title page, item [57]
Abstract, line 4 after "A" insert --UV--.

Column 5, line 24 delete "lie" and insert --11a--;
        line 25 delete "t" and insert --Z--;
        line 51 before "G" insert --R--; and
        line 65 after "data" insert --36--. (2nd occur.)

Signed and Sealed this

Twenty-second Day of September, 1998

Attest:

BRUCE LEHMAN

*Attesting Officer*       *Commissioner of Patents and Trademarks*